Aug. 17, 1937.  C. E. EVANS  2,090,527

CONTAINER

Filed Aug. 14, 1936

INVENTOR.
CHARLES E. EVANS.
BY John C. Brisch
ATTORNEY.

Patented Aug. 17, 1937

2,090,527

UNITED STATES PATENT OFFICE 2,090,527

CONTAINER

Charles E. Evans, Council Bluffs, Iowa, assignor of one-fourth to L. G. Howard, Council Bluffs, Iowa Application August 14, 1936, Serial No. 96,043

5 Claims. (Cl. 220—44)

This invention relates to containers generally and particularly to containers adapted to have the air exhausted therefrom and a vacuum maintained therein. My container is particularly adapted for storing and shipping cream and the like. Such foods as cream are usually stored and shipped in cylindrical cream cans and cream shipped in cans of this character often becomes overheated and spoils particularly if not kept cool.

It has been found that cream and other foods may be preserved for considerable periods of time in containers from which the air has been exhausted even at temperatures at which such food would ordinarily spoil.

It is therefore an important object of my invention to provide a container of this character from which the air may be exhausted and a vacuum created therein.

Another object of my invention is to provide a container of this character in which the vacuum may be positively retained therein.

Another object of my invention is to provide a container of this character wherein the seal may be readily broken when it is desired to open said containers.

A further object is to provide a device of this character having an auxiliary means for maintaining the seal.

A still further object is to provide a container of this character of simple durable construction and of low manufacturing cost.

Numerous other objects and advantages of this invention will be apparent as it is better understood from the following description which, taken in connection with the accompanying drawing discloses a preferred embodiment thereof.

Referring to the drawing.

Figure 1:
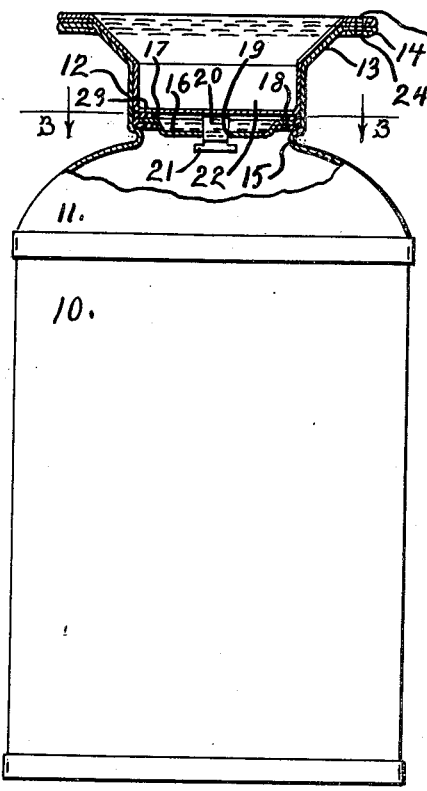
Figure 1 is an elevational view of a cream can with a portion of the upper part and flanged neck thereof in vertical section.
Figure 2:
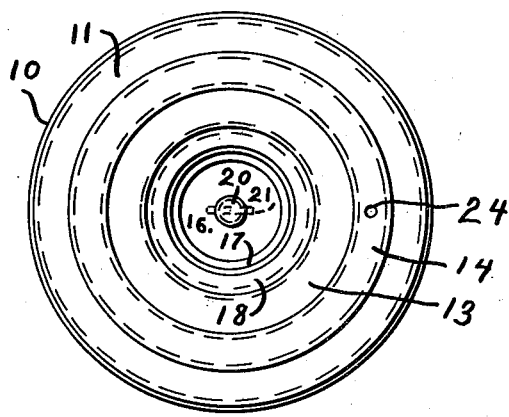
Figure 2 is a plan view of the container with cover removed.
Figure 3:
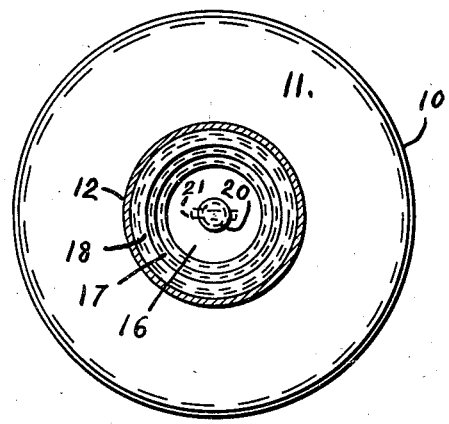
Figure 3 is a horizontal section through the neck of the container taken on line 3—3 of Figure 1.
Figure 4:
Figure 4 is a plan view of the marginal seal of the vacuum sealing disc.
Figure 5:
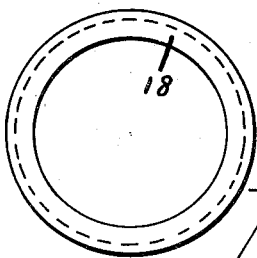
Figure 5 is a plan view of the vacuum sealing disc with the marginal seal removed.
Figure 6:
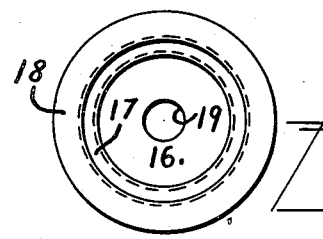
Figure 6 is an elevational view of the stopper of the vacuum sealing disc.

Referring more particularly to the drawing which illustrates a preferred embodiment of my invention, reference numeral 10 indicates the container body generally. The body arches inwardly at 11 and is provided with a vertical neck 12 having an upwardly and outwardly extending portion 13 terminating in a horizontal outwardly extending flange 14. Within the neck 12 is formed a rolled shoulder 15. Means associated with the shoulder 15 for sealing the neck opening comprises a sealing plate having a recessed portion 16 and an outwardly extending flange 17 on which is received a marginal gasket 18 preferably of rubber. The gasket 18 is U-shaped in cross section and receives the flange 17 between the upper and lower portions thereof. The lower face of the gasket 18 rests on shoulder 15; the recessed portion 16 is provided with a central opening 19 adapted to receive therein a stopper 20 tapering inwardly from the top and provided with outwardly extending arms 21 adjacent the lower end thereof.

The upper end of the stopper 20 is larger than the opening 19 and the lower end of said stopper 20 is smaller than said opening 19. The stopper is of greater length than the depth of the recess and the top of said stopper normally extends above the plane of the flange 17. After the container has been filled to a suitable level with cream or other food, the sealing plate is placed in position on the flange 15 of the neck and the air is then exhausted from the container by means of any suitable vacuum pump, said air being removed through the opening 19 and about the sides of the stopper 20. The arms 21 of the stopper engage the under side of the plate and prevent the stopper from being drawn from the opening while the air is being exhausted from the container.

Atmospheric pressure will press the stopper 20 inwardly to seal the opening 19 and cause the sealing plate to press tightly down on the shoulder 15 to insure positive sealing. A cover 22 is pressed into the neck 12, said cover being snugly received therein. The lower end wall 23 of the cover presses against the upper end of the stopper 20 and forces same tightly into the opening 19, said end wall also presses downwardly on the marginal gasket 18. Openings 24 and 25 in the horizontal flange of the neck and the cover respectively provides means for tying the cover to the container after sealing.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

Having thus described my invention what I claim is:

1. In a container, the combination, a body having a neck, an inwardly extending flange in the neck, means cooperating with the flange for sealing the opening in the neck, said means comprising a sealing plate comprising a recessed portion, said recessed portion being provided with an opening, a stopper in said opening tapering from the top to the bottom, laterally extending arms on the lower end of the stopper, said stopper being larger at the top than the opening in the recessed portion and smaller at the bottom than the said opening, an outwardly extending flange on sealing plate, the plane of said flange being below the upper end of the stopper when said stopper is in a normal position, a gasket U-shaped in cross section marginally received on the flange, and a cover received in the neck and adapted to force the stopper tightly into the opening and to press downwardly on the marginal seal.

2. In a container, the combination, a body having a neck, an inwardly extending flange in the neck, a sealing plate having an opening therein, said sealing plate being adapted to be received in the neck in abutment with the flange, gasket means between the plate and the flange, means for closing the opening in the sealing plate, said means being adapted to permit air to be drawn from the container and to close said opening after the air has been thus withdrawn, and a cover adapted to press inwardly on the means for closing the opening in the sealing plate and to marginally press the sealing plate inwardly.

3. In a container, the combination, a body having a neck, an inwardly extending flange in the neck, a sealing plate adapted to be received in the neck, said sealing plate having an opening therein, a gasket between the flange and the sealing plate, means for closing the opening in the sealing plate, and a cover adapted to marginally press inwardly on the sealing plate and to also press inwardly on the sealing means for the opening.

4. In a container, the combination, a body having a neck, an inwardly extending flange in the neck, a sealing plate adapted to be received in the neck and having an opening therein, a gasket for the plate between said plate and the flange in the neck, means for removably closing the opening in the sealing plate and a removable cover holding the removable closing means in its sealing position when said cover is placed in the neck.

5. In a container, the combination, a body having a neck, an inwardly extending flange in the neck, a sealing plate adapted to be received within the neck and having an opening therein, a gasket between the sealing plate and the flange in the neck, a stopper for the opening in the sealing plate, and a cover adapted to abut against the outer end of the stopper and hold same in its sealing position.

CHARLES E. EVANS.